3,801,716
COMPRESSION-GRANULATION OF ROASTED COFFEE

James P. Mahlmann, Wayne, N.J., and Edward L. Scarsella, Bedford Hills, N.Y., assignors to General Foods Corporation, White Plains, N.Y.
No Drawing. Continuation-in-part of application Ser. No. 878,230, Nov. 19, 1969. This application Aug. 18, 1972, Ser. No. 281,678
Int. Cl. A23f 1/02
U.S. Cl. 426—466                                    16 Claims

ABSTRACT OF THE DISCLOSURE

Roasted coffee beans are selectively subjected to either a one or two stage comminution process, a higher grade coffee fraction being comminuted via a single grinding operation and a lower grade coffee fraction being comminuted first by a compression operation and then by a second subdivision (e.g. grinding) operation. The two comminuted fractions may then be combined to produce a roasted and ground coffee product having increased extractability and modified flavor and/or aroma.

---

This case is a continuation-in-part of our copending U.S. patent application, Ser. No. 878,230, filed Nov. 19, 1969 and is also related to our concurrently filed application, Ser. No. 281,676, entitled, "Method For Aromatizing Soluble Coffee," both of which are hereby incorporated by reference.

BACKGROUND OF THE INVENTION

This invention pertains to a novel process for preparing roasted and comminuted coffee which is suitable for use as regular roasted coffee for home brewing or for use in a commercial percolation process to produce soluble coffee.

The standard technique in use today to prepare roasted and ground coffee is to pass green coffee beans into a commercial roaster wherein the coffee is roasted to a predetermined roast color; the roasted coffee on discharge from the roaster is generally quenched with water and then air cooled. The cooled beans are then tempered (allowed to stand to insure uniform distribution of moisture) and passed in roll type grinders, such as a Gump Mill, to obtain coffee particles with a desired size distribution. The roast color may be varied depending upon the types of green coffee used, the flavor characteristics to be developed and the intended use for the roasted coffee (e.g. as regular coffee or as percolator feed in a soluble coffee system). Similarly, the moisture content and particle size will be varied depending upon the intended use for the roasted coffee.

It has also been known to separately process various fractions of a roasted and ground coffee product prior to combining the fractions. Roast and ground coffee products are usually formed by blending a variety of different coffee beans. There are generally considered to be three major types of coffee beans which are blended to form roast and ground coffee products. These are milds and Brazilians, which botanically are both characterized as Arabicas, and there is Robustas which botanically is a Canephora. The Brazilian coffees are relatively nonaromatic and neutral flavored in the cup while high grown mild coffees are very fragrant and acidy, often with heavy body in the cup; low grown milds are thinner in aroma and body in the cup. Robustas have strong distinctive flavor characteristics; they are bitter and usually contain varying degrees of a tarry flavor note.

Separate roasting of different coffee fractions prior to blending the fractions is a well-known technique in the coffee art for controlling the flavor of roasted and ground coffee. Recently issued U.S. Pat. No. 3,544,331 has disclosed that separately grinding different coffee fractions to larger and smaller particle sizes is a means for controlling the effective flavor contribution of distinctive types of roast and ground coffee product.

Some prior art processes have subjected roasted coffee to pressure treatment in a press or in rolls for various reasons. Thus, processes have been described wherein roasted and ground coffee was crushed in a press to obtain coffee tablets or pellets (e.g. U.S. Pat. No. 3,511, 666). Pressing of roasted and ground coffee beans has been reported as a means of increasing the available soluble solids in roasted coffee and as a means of degassing the roasted coffee particles.

Generally, both pressing and comminution (e.g. grinding) of roasted coffee has been considered to be means of changing the physical appearance of and achieving the necessary subdivision for a roasted and ground coffee product. While particle size and shape has been known to have an effect upon appearance and extraction rates, no other special significance is generally attributed to pressing and comminution operations.

SUMMARY OF THE INVENTION

It has now been discovered that if roasted coffee beans are subjected to compression step followed by a further comminution step, unique physical and/or organoleptic properties can be developed.

Compression is intended to describe the process step whereby roasted coffee beans are compressed and at least partially broken into fragments via the application or pressure. Compression may be performed on equipment known in the art, such as compaction mills and presses, which are capable of breaking up the coffee bean into fragments via the application of pressure. It should here be noted that by the term "roasted coffee beans" is meant unground, roasted coffee material which contains significant amounts of whole roasted coffee beans but which also may contain bean fragments (generally at least one-quarter the size of the whole bean) broken as a result of the handling and/or conveying (e.g. airveying) to which the whole beans have been subjected.

Further comminution is a term selected to describe the fact that the coffee obtained via compression may be subjected to additional mechanical subdivision. It is possible to use conventional grinding equipment and obtain an end product comparable in appearance to conventional roast and ground coffee; however, vigorous grinding should be avoided since the compressed coffee is more fragile than whole coffee beans. Alternatively, a granulator or other equipment, which will subject the coffee fragments to a less vigorous subdivision step than conventional grinding, can be used, especially if larger particle sizes are desired in the end product.

The process of this invention is used to obtain unexpected characteristics in a final roast and comminuted coffee product. According to this invention a lower grade fraction of roast coffee beans is subjected to a compression operation followed by a subsequent further comminution step and this subdivided coffee fraction is blended with a higher grade coffee fraction which has been roasted and ground by conventional methods.

As set forth in our parent application roasted coffee beans which have been subjected to a compression operation and further comminution result in a coffee product which has increased available soluble solids and which is more degassed than coffee which is merely subjected to standard grinding techniques. These features can be advantageously applied to lower grade coffee to produce a coffee blend component which will impart a relatively high level of body in a brewed coffee beverage but which will lack the undesirable flavor and/or aroma notes characteristic of lower grade coffees.

The blending of a conventionally processed higher grade coffee fraction with the lower grade fraction which has been compressed and further comminuted is desirable in order to produce a roasted and comminuted coffee product which possess some desirable aroma and flavor notes.

Since the blended product of this invention is degassed in proportion to the amount of the compressed low-grade coffee fraction present in the blend, and since this low-grade fraction may constitute a major fraction of the blend it is possible to use new and more economical containers than the vacuum cans used for packaging standard roasted and ground coffee.

DESCRIPTION OF THE PREFERRED EMBODIMENT

Compression can be carried out on several different types of equipment. Regardless of the equipment used it is important to control the actual pressure applied to the roasted coffee beans. This pressure should normally be between about 1500 to 13,000 p.s.i. and more preferably about 4000 to 7500 p.s.i. Standard presses such as a Stokes Tablet Press can be successfully employed in the process of this invention. After the beans have been pressed on a standard press they may be subjected to shaking action on a screen wherein the pressed coffee beans tend to break up into particles. The beans are normally broken up into chunk-like particles; however, at elevated bean temperature of about 250 to 350° F. flake-like particles may result. The very large particles or beans which have not been broken may be separated out as overs and recycled into the pressing operation. It has been found that compacting Mills such as those produced by Komarek-Greaves, described in their catalogue 200 are a more preferred means of achieving compression. The roasted whole coffee beans may be force fed between the compression rolls of the compacting mill and tend to come out in the form of pressed beans, which break apart into particles. Note that this use of compaction mills is somewhat different from that described as the normal purpose of a compaction mill which is to press small particles, having a relatively low bulk density into a cake which cake is then broken into particles having a size and bulk density significantly greater than that of the feed material. In the process of this invention whole coffee beans are being subdivided into particles which are significantly smaller and denser than the feed material.

It has been found that to avoid excessive fines in the final product, a relatively coarse feed material should be used. Thus, the use of coffee beans as opposed to ground coffee should be employed in order to obtain the full benefits of this invention. In order to prevent excessive fines production it is desirable to have the beans grabbed by the rolls and passed through in a continuous stream. It has been found that if the surface of the rolls are roughened or corrugated the desired feed is obtained and fines are kept at a minimum as compared to smooth rolls. This is particularly true where the diameter of the rolls is 20 inches or less. Larger rolls may not need a rough surface because of the greater angle of nip at the point the beans are passed between the rolls.

When using compression rolls the pressure rather than being expressed as lbs. per square inch (as when using a press) is commonly expressed as lbs. per linear inch. It has been found that the pressure applied to compression rolls may vary from 50 to 3000 lbs. per linear inch when practicing the process of this invention, and a preferred range is from 50 to 300 lbs. per linear inch. Note, that this is an unusually low range for compaction mills which are designed to run at pressures from 12,000 to about 25,000 lbs. per linear inch when they are being used to compact granular materials into a cake form.

It has been found that the coffee particles produced via the compression operation are significantly more fragile than the whole coffee bean and can be ground via a gentle granulation technique, as opposed to the standard toll type grinders used in the coffee industry today. One method of carrying out the gentle granulation is to use equipment commonly referred to as a granulator, such as those produced by Colton or Stokes. The granulators have an advantage in that the particles are broken into small pieces which are forced through a screen, and the screen size can be varied as a means of controlling the particle size of the final product. While there is no specific limitation on the screen size to be used, it has been found that coffee with desirable qualities can be prepared using standard screens that vary from 4 to 10 mesh. Using granulator type eyuipment the final particle size can be made substantially larger than the size of regular roasted and ground coffee which averages about 18 mesh. If, however, it is desired to produce conventionally sized particles, roll type grinders can also be used as an alternate means of achieving further comminuting so long as the proper roll surface and spacing are selected to avoid excessive breakage of the particles during the grinding step.

Several major changes in the physical characteristics of the coffee are attributed directly to the pressure to which the beans are subjected during the compression operation. These are: an increase in density, an increase in available atmospherically extractable soluble solids, and degassing. It has been found that the available soluble solids are increased by 8 to 40% with the greater increases being associated with higher pressures. There is apparently a limit to the increase in solids achieved via the application of pressure. The application of higher pressures does not significantly increase the available solids above 40%. Compressed coffee has also been found to give a clearer, less turbid brew than uncompressed coffee.

Pressure can be used to control the final density of the product. Surprisingly, it has been found that the size to which the compressed coffee is subsequently comminuted does not have as significant an effect upon density as the pressure used in the compression operation. The following table summarizes the effect of pressure on density for a wide variety of coffees compressed in a Stokes press and processed through 4 mesh, 7 mesh and 10 mesh screens on a Colton granulator:

EFFECT OF PRESSURE ON DENSITY

| Pressure (p.s.i.) | Density (g./cc.) | Percent increase [1] |
|---|---|---|
| 6,000 | 0.38–0.41 | 10–18 |
| 9,000 | 0.43–0.46 | 25–32 |
| 12,000 | 0.49–0.52 | 38–47 |

[1] Increase is compared to standard roasted and ground coffee not treated by the process of this invention having a density of 0.350 g./cc.

During the compression operation the coffee is degassed. It has been found that at least 800 cc. of gas per pound of coffee processed is expelled. Thus, a degassed coffee is achieved via the process of this invention. Several potential advantages are associated with the degassing. First, it is not necessary to have a hold up period after grinding, (normal technique in a standard coffee operation) prior to packaging. The absence of hold-up should help increase the stability of the coffee by decreasing the time the coffee is exposed to oxygen. Also the coffee can be packaged in new and novel containers which do not have to be capable of withstanding a pressure buildup in the package as large as that produced from a package containing all uncompressed coffee.

It is also a feature of this invention that the gas expelled in the compression operation can be used to maintain an inert atmosphere around the coffee from the time it enters the compression equipment to the time it is packaged. Thus, if the equipment being used is shrouded, it may be found that sufficient gas is liberated to replace the air in the shroud and since additional gas is constantly being liberated, an inert atmosphere is maintained. Our concurrently filed application. Ser. No. 281,676 discloses that the liberated gas may also be used to aromatize soluble coffee products.

It has been found that the use of roll flaking mills (e.g. the commercially available Lauhoff, Farrel, Lehmann, etc.) are not as desirable as compaction mills for use in this invention, since the spring-loaded rolls of these mills do not exert as true and/or as constant a pressure upon the coffee beans as do the hydraulically controlled compaction mills. Additionally, flaking mills are not designed to operate at the pressure levels required for this invention and would be subject to frequent breakdowns if forced to operate continuously at pressures in excess of 50 lbs. per linear inch. Flaking mills have not been found to produce sufficient compression of the coffee beans for purposes of this invention, unless the beans are at elevated temperatures.

It has also been found that increased degassing of the coffee beans during the compression operation can be achieved if the compression operation is conducted at elevated temperatures and or partial vacuum. Heat may be supplied either by heating the compression rolls or heating the coffee. It will also be possible to use coffee which has not been completely cooled after the roasting step. Compression of a low grade coffee fraction may take place at a coffee temperature between about 32° F. and 350° F., and preferably from about 150 °F. to 350° F. It has been found that within the preferred temperature range the amount of degassing of the low grade coffee can be increased as the temperature increases without degrading the flavor and/or aroma of those constituents which may remain in the coffee. The amount of degassing is, in general, directly related to the amount of aromatics removed. Thus, by varying the compression pressure, temperature and/or vacuum, varying amounts of aromatics may be removed from the coffee.

For purposes of this invention, the most important result of the compression operation is the disruption of virtually all the cells in the coffee beans and the substantial degassing of the beans. Rupturing of the cells produces a coffee material which will be more readily extracted or which will yield a higher level of soluble solids as compared to similarly sized ground but uncompressed coffee material. The ruptured cells also permit entrapped gases to quickly pass out of the coffee material. These evolving gases, most carbon dioxide, include much of the volatile material which gives the coffee material its distinctive aroma and/or flavor. And while this might at first thought be undesirable, it is recognized in the art that the lower grades of coffee contain many aroma and/or flavor notes which are undesirable. Consequently the compression operation described in this invention is particularly useful on low grade coffee beans; and especially on low grade coffee fraction which is to be blended with an uncompressed, high grade, roasted and ground coffee fraction.

The types of coffees that will be included in the respective low and high grade coffee fractions of this invention will be apparent to those skilled in the art. Generally speaking, however, the low grade fraction will contain a high, up to 100%, level of Robusta-type coffees, together with lesser amounts of other non-high grade types of coffees, such as Brazils and natural Arabicas. While high quality coffee may be included in the low grade fraction, it will usually be considered wasteful to do so.

The uncompressed high grade coffee fraction may contain a major, up to 100%, level of high quality coffees such as high-grown milds and may also include lesser amounts of the non-high grade types of coffees, such as Brazils. If a relatively inexpensive roasted coffee product is desired, the roasted and ground, uncompressed high grade coffee fraction may normally constitute only a minor weight fraction of the total blend, with 10% to 40% by weight being a suitable level. However, the uncompressed high grade fraction may constitute a major amount of the blend, if a relatively expensive, high quality coffee product is desired.

Using the process of this invention the physical appearance of the final blended product may vary from that of regular roasted and ground coffee (averaging about 18 U.S. mesh) to that of substantially coarser appearing product having a coarse major fraction and a minor fraction of regular roast and ground coffee. It will be readily apparent to those skilled in the art that the coarser the final particle size of the compressed coffee is, the lower will be its extractability; however, since substantially all the cells of the compressed coffee are ruptured, coarse particles of the compressed coffee will extract at least as readily as the smaller particles of regular roasted and ground coffee. When the compressed coffee is further comminuted to the particles size of conventional roasted and ground coffee, a coffee blend containing these particles will have a higher level of soluble solids and will produce a stronger brew than regular roasted and ground coffee.

When the fraction of compressed coffee is comprised of more than one type of coffee, it may be desirable to separately compress the different coffees, since the different coffees may not compress the same way. This separate compression operation can be readily incorporated into systems which also separately roast the different types of coffee.

It has also been found that compression of roasted coffee tends to affect the coffee flavor in a manner comparable to further roasting. Thus, it may be desirable to roast the coffee material (either a blend or a single type of coffee) which is to be compressed to a point which is lighter than its optimum roast color. Various degrees of compression will not produce the same effect on all types of coffee material; however, having the basic principle that compression acts like darkening the roast, one skilled in the art will be readily able to determine the proper roasting conditions for the coffee which is to be compressed.

This invention is further described but not limited by the following examples.

EXAMPLE 1 (2376–41)

A taste test was conducted comparing roasted coffee products containing on a weight basis 35% milds, 40% Brazilian and 25% Robusta coffees. Samples J and M were prepared by conventional grinding of a blend of the above coffees to a regular grind size in a Hobart grinder (Lab Model). Sample D was prepared by blending together a milds fraction ground to a regular grind size in the Hobart Grinder and Brazilian and Robusta fractions which have each been compressed in a Stokes Model No. 294 Press at a pressure of about 11,000 p.s.i.g. and passed through a Colton granulator having a 7 U.S. mesh screen. The three samples of roasted and comminuted were each used to produce a brewed coffee beverage in a stove top percolator using a 7 minutes percolating period and 57 grams of coffee per liter of water. A panel of skilled coffee tasters were used in an odd-cup taste test and three out of four panelists were able to detect significant differences between the compressed coffee, sample D, and samples J and M.

EXAMPLE 2 (2376–42)

A separate taste test was conducted on the 35/40/24 blend of Example 1 following the procedure set forth in Example 1. Six out of seven of the panelists were able to detect differences between the beverage containing the compressed coffee and the two control beverages which contained only regular roasted and ground coffee.

EXAMPLE 3 (2451–43)

Brazilian coffee beans were roasted to their optimum roast color (65 roast color—Photoelectric Reflection Unt Model 610 and Model G10Y Search Unit) in a Probat 50 pound roaster. One fraction of roasted beans were ground to a regular grind size in a Hobart mill. A second fraction of beans was compressed in a Stokes press at about 10,000 p..i.g. and then passed through a Colton granulator having a 10 U.S. mesh screen. Stove top percolators were used at the same conditions to prepare coffee beverages from the two fractions. Skilled coffee tasters found the beverage produced from the compressed coffee to be significantly different from and preferred over that of the ground coffee.

EXAMPLE 4 (2451–43)

Following the procedure set forth in Example 3 a roasted and regular grind Brazilian coffee fraction having a 65 roast color was compared against a compressed and granulated Brazilian coffee fraction having a lighter 74 roast color. The coffee beverage prepared from the compressed sample was rated as equal to or superior than the beverage prepared from the roasted and ground sample; however, the compressed coffee was, in each instance, regarded as being closer to the roasted and ground coffee than in Example 3. This example shows that it is desirable to roast coffee which is to be compressed to a lighter than normal roast color, as compression acts as if to darken the roast.

It will be apparent to those skilled in the art that the roasted and comminuted coffee product produced in accordance with this invention, which may be both more degassed and have a higher level of available soluble solids than conventional roasted and ground coffee, will be useful in many different roasted coffee products. Thus the product of this invention may be used in the production of coffee brewing packages such as the wrapped percolator pellets, as described in U.S. Pat. No. 3,511,666, and the infusion bags described in U.S. Pat. No. 3,053,665.

Having thus described the invention what is claimed is:

1. A method of producing a roasted and comminuted coffee product comprising the step of:
   (a) preparing a roasted higher quality coffee bean fraction,
   (b) separately preparing a roasted lower quality coffee bean fraction,
   (c) grinding the higher quality roasted coffee bean fraction,
   (d) compressing the lower quality roasted coffee bean fraction to the extent that virtually all the cells in the beans have been disrupted,
   (e) comminuting the compressed lower quality coffee, and
   (f) blending the ground higher quality coffee with the compressed and comminuted lower quality coffee.

2. The method of claim 1 wherein the lower quality coffee fraction is compressed between pressure rolls and wherein a pressure from 50 to 3000 lbs. per linear inch is applied.

3. The method of claim 2 wherein the pressure is from 50 to 300 lbs. per linear inch.

4. The method of claim 3 wherein the lower quality coffee is compressed in a compaction mill.

5. The method of claim 1 wherein the lower quality coffee is compressed in a press at from 1,500 to 13,000 p.s.i.g.

6. The method of claim 5 wherein the pressure is from 4,000 to 7,500 p.s.i.g.

7. The method of claim 1 wherein the lower quality coffee consists of Brazilian and Robusta type coffees.

8. The method of claim 7 wherein the higher quality coffee comprises from 10% to 40% by weight of the blend.

9. The method of claim 7 wherein the higher quality consists of mild type coffee.

10. The method of claim 1 wherein the compressed low quality coffee is comminuted by means of grinding rolls.

11. The method of claim 1 wherein the compressed coffee is comminuted by means of a granulator having a 4 to 10 U.S. mesh screen.

12. The method of claim 1 wherein the temperature of the roasted low quality coffee during compression is from about 150° F. to 350° F.

13. The method of claim 1 wherein the compression equipment is shrouded in order to maintain an inert atmosphere during the compression operation.

14. The method of claim 1 wherein the lower quality coffee function has a roast color lighter than its optimum roast color.

15. The method of claim 1 wherein the roasted and comminuted coffee product is extracted in a soluble coffee system.

16. The method of claim 1 wherein the roasted and comminuted coffee product is packaged in a coffee brewing package.

References Cited

UNITED STATES PATENTS

| | | | |
|---|---|---|---|
| 3,615,667 | 10/1971 | Joffe | 99—68 |
| 2,282,708 | 5/1942 | Dantzig | 99—68 |
| 3,493,388 | 2/1970 | Hair | 99—71 |
| 3,511,666 | 5/1970 | Hudson et al. | 99—66 |
| 1,903,362 | 4/1933 | McKinnis | 99—65 |
| 3,544,331 | 12/1970 | Hair | 99—68 |

FOREIGN PATENTS

| | | | |
|---|---|---|---|
| 808,588 | 3/1969 | Canada | 99—66 |

FRANK W. LUTTER, Primary Examiner

W. L. MENTLIK, Assistant Examiner

U.S. Cl. X.R.

426—473